United States Patent
Subba et al.

(10) Patent No.: US 11,201,387 B2
(45) Date of Patent: Dec. 14, 2021

(54) ELECTRICALLY ISOLATED CORNER STIFFENER

(71) Applicant: Microsoft Technology Licensing, LLC, Redmond, WA (US)

(72) Inventors: Chandrashekar Gernipalli Subba, Redmond, WA (US); Prasad Raghavendra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 817 days.

(21) Appl. No.: 15/783,379

(22) Filed: Oct. 13, 2017

(65) Prior Publication Data

US 2019/0115648 A1    Apr. 18, 2019

(51) Int. Cl.
| | |
|---|---|
| *H01Q 1/24* | (2006.01) |
| *H04M 1/02* | (2006.01) |
| *H04M 1/18* | (2006.01) |
| *H01Q 1/22* | (2006.01) |
| *G06F 1/16* | (2006.01) |

(Continued)

(52) U.S. Cl.
CPC ........... *H01Q 1/243* (2013.01); *G06F 1/1626* (2013.01); *G06F 1/1656* (2013.01); *G06F 1/1698* (2013.01); *H01Q 1/2266* (2013.01); *H04M 1/185* (2013.01); *H01Q 1/42* (2013.01); *H01Q 1/52* (2013.01); *H04M 1/026* (2013.01); *H04M 1/0249* (2013.01)

(58) Field of Classification Search
CPC ........ H01Q 1/243; H01Q 1/2266; H01Q 1/42; H01Q 1/52; G06F 1/1698; G06F 1/1656; G06F 1/1626; H04M 1/185; H04M 1/0249; H04M 1/026
See application file for complete search history.

(56) References Cited

U.S. PATENT DOCUMENTS 7,059,182 B1    6/2006    Ragner
8,233,109 B2    7/2012    Bergeron et al.
(Continued)

FOREIGN PATENT DOCUMENTS

CA    2840519 A1    1/2013

OTHER PUBLICATIONS

"International Search Report and Written Opinion Issued in PCT Application No. PCT/US2018/054785", dated Jan. 25, 2019, 13 Pages.

*Primary Examiner* — Rockshana D Chowdhury
(74) *Attorney, Agent, or Firm* — Holzer Patel Drennan

(57) ABSTRACT

Mobile computing devices often incorporate a window along a discrete portion of a perimeter of a metallic device case adjacent the antennae and a plastic cover that covers the window and seals antennae within the mobile computing device. As mobile computing devices shrink in physical size and weight and become more portable, available space within the mobile computing devices for the antennae shrinks. Merely increasing the size of the connectivity window to occupy up to a full width or length of the perimeter of the metallic device case may negatively impact overall device stiffness requirements. The electrically isolated corner stiffeners described herein may permit larger antennae windows for wireless connectivity, while meeting applicable stiffness requirements for an associated mobile computing device.

19 Claims, 5 Drawing Sheets

(51) Int. Cl.
  *H01Q 1/42* (2006.01)
  *H01Q 1/52* (2006.01)

(56) References Cited

U.S. PATENT DOCUMENTS

| | | | |
|---|---|---|---|
| 8,587,939 B2* | 11/2013 | McClure | G06F 1/1626 |
| | | | 361/679.3 |
| 8,909,309 B2 | 12/2014 | LaColla et al. | |
| 9,075,567 B2 | 7/2015 | Mathew et al. | |
| 10,665,924 B2* | 5/2020 | Son | H01Q 1/42 |
| 2009/0040115 A1* | 2/2009 | Zhang | H01Q 1/243 |
| | | | 343/702 |
| 2009/0067141 A1 | 3/2009 | Dabov et al. | |
| 2012/0044123 A1* | 2/2012 | Rothkopf | H01Q 1/243 |
| | | | 343/878 |
| 2012/0155035 A1 | 6/2012 | Chen et al. | |
| 2012/0194998 A1* | 8/2012 | McClure | G06F 1/1626 |
| | | | 361/679.56 |
| 2013/0293424 A1 | 11/2013 | Zhu et al. | |
| 2014/0197997 A1 | 7/2014 | Yang et al. | |
| 2016/0233573 A1 | 8/2016 | Son et al. | |

* cited by examiner

ELECTRICALLY ISOLATED CORNER STIFFENER

BACKGROUND

Mobile computing devices are increasingly expected to incorporate multiple high-performance wireless connectivity options, which may require high-performance antennae. Further, many mobile computing devices incorporate large metallic components (e.g., a metallic case) that may interfere with communications received by and/or sent from nearby antennae. As a result, these mobile computing devices often incorporate a window along a discrete portion of a perimeter of the metallic device case adjacent the antennae and a plastic cover that covers the window and seals the antennae within the mobile computing device.

As mobile computing devices shrink in physical size and weight and become more portable, available space within the mobile computing devices for the antennae also shrinks. Merely increasing the size of the connectivity window to occupy up to a full width or length of the perimeter of the metallic device case may negatively impact overall device stiffness, particularly at the corners. As a result, there is a need for a mobile computing device design that may incorporate high-performance wireless connectivity options, while also meeting device stiffness requirements.

SUMMARY

Implementations described and claimed herein provide a mobile computing device comprising a device chassis, a pair of corner stiffeners, and an antenna assembly. The corner stiffeners are each secured to opposing corners of the device chassis along a side of the mobile computing device and are electrically isolated from the device chassis. The antenna assembly incorporates one or more antennae and spans a distance between the corner stiffeners.

Implementations described and claimed herein further provide a method of assembling a mobile computing device. The method comprises securing each of a pair of electrically isolated corner stiffeners to opposing corners of a device chassis along a side of the mobile computing device, and securing an antenna assembly within the mobile computing device spanning a distance between the corner stiffeners.

Implementations described and claimed herein still further provide a mobile computing device comprising a conductive bucket, a non-conductive antenna cover, a pair of corner stiffeners, each secured to opposing corners of the conductive bucket and the non-conductive antenna cover along a side of the mobile computing device, and an antenna assembly incorporating one or more antennae oriented adjacent the non-conductive antenna cover. The conductive bucket and the non-conductive antenna cover in combination span a majority of the rear-facing area of the mobile computing device, the corner stiffeners are electrically isolated from the conductive bucket, and the antenna assembly is secured to the corner stiffeners and spans an entire distance between the corner stiffeners.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The electrically isolated corner stiffeners described herein may permit larger antennae windows for wireless connectivity, while meeting applicable stiffness requirements for an associated mobile computing device.

Figure 1:
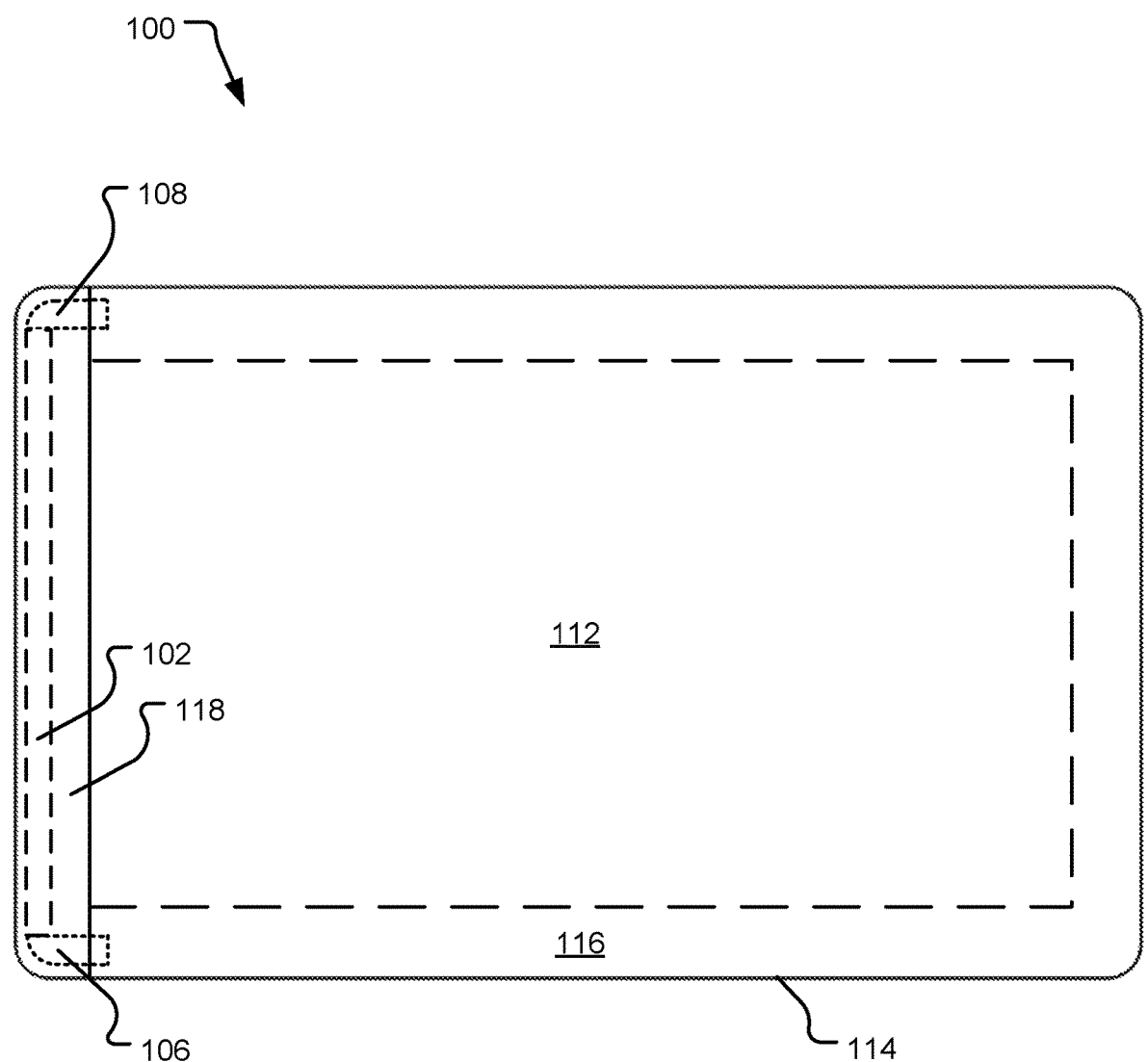
FIG. 1 illustrates a rear plan view of an example mobile computing device incorporating full-width antennae and electrically isolated corner stiffeners.

FIG. 1 illustrates a rear plan view of an example mobile computing device 100 incorporating full-width antenna assembly 102 and electrically isolated corner stiffeners 106, 108. The mobile computing device 100 includes a touch-screen or other display screen 112 (shown in dashed lines as it is hidden from view in FIG. 1) that spans a front-facing surface and a chassis 114 that spans a rear-facing surface of the mobile computing device 100. The chassis 114 and the display screen 112 in combination serve as protective covers and mounting structures for internal electronic components (e.g., structural framework, printed circuit boards, microprocessors, integrated circuits, electronic storage devices, cooling components, cameras, antennae, speakers, microphones, and batteries) of the mobile computing device 100. The chassis 114 and/or the display screen 112 may also occupy side-facing surfaces of the mobile computing device 100, and in combination encompass the internal electronic components of the mobile computing device 100. The chassis 114 includes both a conductive (or metallic) bucket 116 and a non-conductive (or plastic) antenna cover 118. The non-conductive antenna cover 118 spans an area of the rear-facing surface of the mobile computing device 100 adjacent the antenna assembly 102 and forms a window of wireless connectivity to and from the antenna assembly 102 (also referred to as an electromagnetic window). In various implementations, the conductive bucket 116 spans 70-90% of total rear-facing surface area of the mobile computing device 100, while the non-conductive antenna cover 118 spans 10-30% of the total rear-facing surface area. Further, the conductive bucket 116 in combination with the non-conductive antenna cover 118 spans substantially all (or greater than 90%) of the entire rear-facing area of the mobile computing device 100.

The conductive bucket 116 is made of a generally stiffer and heavier material than the non-conductive antenna cover 118, but has a greater potential to create electromagnetic interference (e.g., radio-frequency (RF) interference) than the non-conductive antenna cover 118. As a result, the conductive bucket 116 occupies areas of the rear-facing surface area of the mobile computing device 100 away from the antenna assembly 102. In various implementations, the conductive bucket 116 is made of a metal alloy of aluminum, copper, chromium, iron, magnesium, nickel, titanium, and/or zinc (e.g., stainless steel), for example.

The non-conductive antenna cover 118 is made of a generally lighter and more flexible material than the conductive bucket 116. In contrast to the conductive bucket 116, the non-conductive antenna cover 118 has less potential to create electromagnetic interference. In various implementations, the non-conductive antenna cover 118 is made of a wholly plastic or plastic composite material such as a polyethylene, polyvinyl chloride (PVC), acrylonitrile butadiene styrene (ABS), polycarbonate (PC), PC/ABS, glass-filled polycarbonate, carbon fiber reinforced polymer (CFRP), and other fiber reinforced polymers. Some of the aforementioned materials may perform better than others with regard to the absence of electromagnetic interference.

The antenna assembly 102 includes a substrate or other non-conductive material onto which individual metal antennae patterns are printed or individual metal antennae wires are embedded. The antenna assembly 102 sends outbound wireless signals and/or receives inbound wireless signals using one or more of a variety of communication technologies and protocols (e.g., Wi-Fi, long-term evolution (LTE), Bluetooth, infrared, near field communication, ultraband, ZigBee, and wireless communication using other connectivity standards). In some implementations, the antenna assembly 102 is referred to as a slot antenna.

The substrate or other non-conductive material is a supporting structure for the individual metal antennae patterns. The antenna assembly 102 (shown in dashed lines as it is hidden behind the non-conductive antenna cover 118) spans a majority of a left-side perimeter of the mobile computing device 100 between the corner stiffeners 106, 108. In various implementations, the antenna assembly 102 spans greater than 90% of a total height or length of the mobile computing device 100. Further, the antenna assembly 102 may span an entire distance between the corner stiffeners 106, 108, particularly when the antenna assembly 102 is attached to the corner stiffeners 106, 108. In implementations where the antenna assembly 102 is not attached to the corner stiffeners 106, 108, the antenna assembly 102 spans greater than 90% of the distance between the corner stiffeners 106, 108.

The corner stiffeners 106, 108 are relatively rigid structures (e.g., made of metal alloy, ceramic, ceramic glass, high-strength plastic, or composite materials) that tie two or more other structures within the mobile computing device 100 together at the corners to enhance structural rigidity of the mobile computing device 100, particularly at the corners. As the corners are the most susceptible areas of the mobile computing device 100 to potential impact damage (e.g., damage caused by dropping the mobile computing device 100 onto a hard surface), the corner stiffeners 106, 108 provide additional resistance to bending and/or twisting failure modes, particularly during an impact event.

In various implementations, the corner stiffeners 106, 108 are attached to one or more of the antenna assembly 102, the non-conductive antenna cover 118, and other components within the mobile computing device 100. The corner stiffeners 106, 108 (shown in dotted lines as they are also hidden behind one or both of the conductive bucket 116 and the non-conductive antenna cover 118) provide additional stiffness to the mobile computing device 100, particularly at their respective corners. The corner stiffeners 106, 108 are secured to one or more of the conductive bucket 116, the non-conductive antenna cover 118, and the antenna assembly 102.

The corner stiffeners 106, 108 may be referred to herein as electrically isolated from the conductive bucket 116 and other metallic components of the mobile computing device 100. In various implementations, this may mean one or more of that the corner stiffeners 106, 108 are RF isolated, the corner stiffeners 106, 108 are of an electrically non-conductive material, and an electrically non-conductive material physically separates the corner stiffeners 106, 108 from the conductive bucket 116. As the corner stiffeners 106, 108 are electrically isolated (or electrically floating), they do not cause substantial interference with the antenna assembly 102.

While the antenna assembly 102 and associated corner stiffeners 106, 108 are illustrated on the left-hand side of the mobile computing device 100 of FIG. 1, the antenna assembly 102 may span any side of the mobile computing device 100 of FIG. 1 (including long or short sides of the mobile computing device 100). Further, in some implementations, the mobile computing device 100 includes multiple antennae assemblies spanning multiple sides of the mobile computing device 100, with three or more associated corner stiffeners.

In various implementations, the mobile computing device 100 is a tablet computer, laptop computer, personal computer, gaming device, smart phone, or any other discrete mobile device that carries out one or more specific sets of arithmetic and/or logical operations. The electrically isolated corner stiffeners 106, 108 may take a variety of physical forms, including various sizes and shapes. In some instances, the mobile computing device 100 is hingedly attached to and/or removable from a keyboard portion (not shown). The mobile computing device 100 may also be sealed within a fabric covering (not shown) that serves to protect the internal electronic components from contaminates and hide seams between the various components of the mobile computing device 100 (e.g., seams between the conductive bucket 116 and the non-conductive antenna cover 118).

Figure 2:
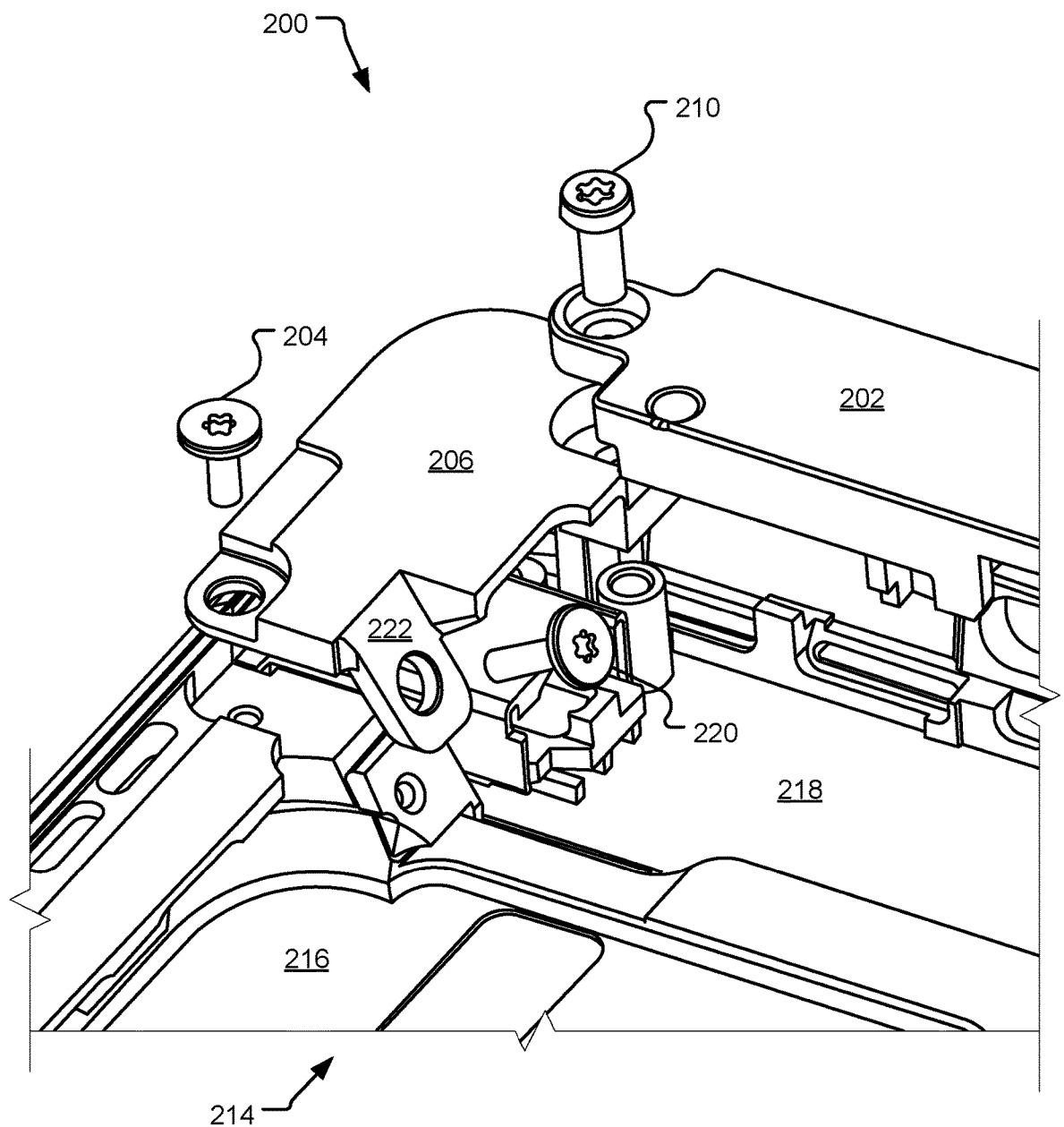
FIG. 2 illustrates a partial exploded perspective view of an example electrically isolated corner stiffener assembled within a mobile computing device.

FIG. 2 illustrates a partial exploded perspective view of an example electrically isolated corner stiffener 206 assembled within a mobile computing device 200. The mobile computing device 200 includes a touchscreen or other display screen (omitted in FIG. 2 to illustrate internal components of the mobile computing device 200) that spans a front-facing surface and a chassis 214 that spans a rear-facing surface of the mobile computing device 200. The chassis 214 and/or the display screen may also occupy side-facing surfaces of the mobile computing device 200, and in combination encompass internal electronic components of the mobile computing device 200.

The chassis 214 includes both a conductive (or metallic) bucket 216 and a non-conductive (or plastic) antenna cover 218. The conductive bucket 216 is made of a generally stiffer and heavier material than the non-conductive antenna cover 218 and has a greater potential to create electromagnetic interference than the non-conductive antenna cover 218. As a result, the conductive bucket 216 occupies areas of rear-facing and side-facing surfaces of the mobile computing device 200 away from an antenna assembly 202. The non-conductive antenna cover 218 spans rear-facing and side-facing surfaces of the mobile computing device 200 adjacent the antenna assembly 202 and forms a window of wireless connectivity to and from the antenna assembly 202. The non-conductive antenna cover 218 is made of a generally lighter and more flexible material than the conductive bucket 216 and has less potential to create electromagnetic interference.

The antenna assembly 202 includes a substrate or other non-conductive or dielectric material onto which individual metal antennae patterns are printed or individual metal antennae wires are embedded. The substrate or other non-conductive or dielectric material is a supporting structure for the individual metal antennae. The antenna assembly 202 sends outbound wireless signals and/or receives inbound wireless signals using one or more of a variety of communication technologies and protocols. The antenna assembly 202 spans a majority of a side perimeter of the mobile computing device 200 between the corner stiffener 206 and a second corner stiffener oriented at an opposite corner of the mobile computing device 200 (not shown). The second corner stiffener may have the same or similar features as the corner stiffener 206 as described herein.

The corner stiffener 206 is a relatively rigid structure that ties the conductive bucket 216, the non-conductive antenna cover 218, and the antenna assembly 202 together at the depicted corner to enhance structural rigidity of the mobile computing device 200. More specifically, each of the conductive bucket 216, the non-conductive antenna cover 218, and the antenna assembly 202 are screwed to the corner stiffener 206. Screw 204 attaches the corner stiffener 206 to the conductive bucket 216. Screw 210 attaches the antenna assembly 202 to both the corner stiffener 206 and the non-conductive antenna cover 218. The screws 204, 210 are oriented in substantially the same direction, which is normal to the display screen of the mobile computing device 200.

The corner stiffener 206 includes an interlocking tab 222, which projects away from the corner stiffener 206 in a plane that substantially differs from the remainder of the corner stiffener 206. Screw 220 attaches the corner stiffener 206 to both the non-conductive antenna cover 218 and the conductive bucket 216 at the interlocking tab 222. The screw 220 is oriented in a different direction than the screws 204, 210, which aids in securing the corner stiffener 206 against movement in all directions within the mobile computing device 200.

The corner stiffener 206 is made of an electrically non-conductive material and thus electrically floats with reference to the conductive bucket 216. The corner stiffener 206 further electrically separates the antenna assembly 202 from the conductive bucket 216 and does not substantially interfere with an electromagnetic window created by the non-conductive antenna cover 218 and communications to and from the antenna assembly 202.

Figure 3:
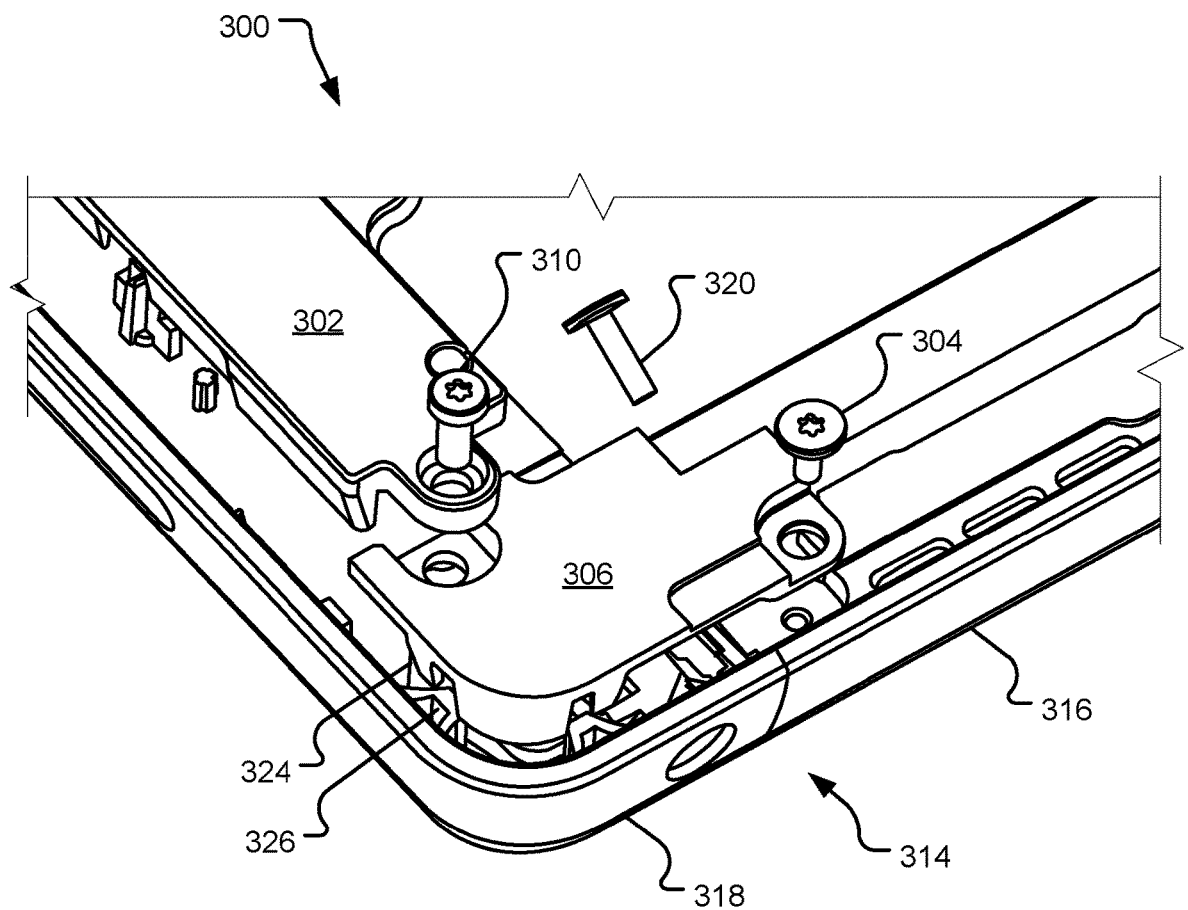
FIG. 3 illustrates a partial exploded perspective view of another example electrically isolated corner stiffener assembled within a mobile computing device.

FIG. 3 illustrates a partial exploded perspective view of another example electrically isolated corner stiffener 306 assembled within a mobile computing device 300. The mobile computing device 300 includes a touchscreen or other display screen (omitted in FIG. 3 to illustrate internal components of the mobile computing device 300) that spans a front-facing surface and a chassis 314 that spans a rear-facing surface of the mobile computing device 300. The chassis 314 and/or the display screen may also occupy side-facing surfaces of the mobile computing device 300, and in combination encompass internal electronic components of the mobile computing device 300.

The chassis 314 includes both a conductive (or metallic) bucket 316 and a non-conductive (or plastic) antenna cover 318. The conductive bucket 316 is made of a generally stiffer and heavier material than the non-conductive antenna cover 318 and has a greater potential to create electromagnetic interference than the non-conductive antenna cover 318. As a result, the conductive bucket 316 occupies areas of rear-facing and side-facing surfaces of the mobile computing device 300 away from an antenna assembly 302. The non-conductive antenna cover 318 spans rear-facing and side-facing surfaces of the mobile computing device 300 adjacent the antenna assembly 302 and forms a window of wireless connectivity to and from the antenna assembly 302. The non-conductive antenna cover 318 is made of a generally lighter and more flexible material than the conductive bucket 316 and has less potential to create electromagnetic interference.

The antenna assembly 302 includes a substrate or other non-conductive or dielectric material onto which individual metal antennae patterns are printed or individual metal antennae wires are embedded. The substrate or other non-conductive or dielectric material is a supporting structure for the individual metal antennae. The antenna assembly 302 sends outbound wireless signals and/or receives inbound wireless signals using one or more of a variety of communication technologies and protocols. The antenna assembly 302 spans a majority of a side perimeter of the mobile computing device 300 between the corner stiffener 306 and a second corner stiffener oriented at an opposite corner of the mobile computing device 300 (not shown). The second corner stiffener may have the same or similar features as the corner stiffener 306 as described herein.

The corner stiffener 306 is a relatively rigid structure that ties the conductive bucket 316, the non-conductive antenna cover 318, and the antenna assembly 302 together at the depicted corner to enhance structural rigidity of the mobile computing device 300. More specifically, each of the conductive bucket 316, the non-conductive antenna cover 318, and the antenna assembly 302 are screwed to the corner stiffener 306. Screw 304 attaches the corner stiffener 306 to the conductive bucket 316. Screw 310 attaches the antenna assembly 302 to both the corner stiffener 306 and the non-conductive antenna cover 318. The screws 304, 310 are oriented in substantially the same direction, which is normal to the display screen of the mobile computing device 300.

The corner stiffener 306 includes a first interlocking tab (not shown), which projects away from the corner stiffener 306 in a plane that substantially differs from the remainder of the corner stiffener 306. Screw 320 attaches the corner stiffener 306 to both the non-conductive antenna cover 318 and the conductive bucket 316 at the interlocking tab. The screw 320 is oriented in a different direction than the screws 304, 310, which aids in securing the corner stiffener 306 against movement in all directions within the mobile computing device 300.

The corner stiffener 306 includes a set of interlocking tabs (e.g., interlocking tab 324), which project away from the corner stiffener 306 and toward the non-conductive antenna cover 318. The set of interlocking tabs interface with a set of receptacles (e.g., receptacle 326) in the non-conductive antenna cover 318 to further secure the corner stiffener 306 to the non-conductive antenna cover 318. Screws 304, 310, 320 hold the corner stiffener 306 in place with the set of interlocking tabs secured within the set of receptacles.

The corner stiffener 306 is made of an electrically non-conductive material and thus electrically floats with reference to the conductive bucket 316. The corner stiffener 306 further electrically separates the antenna assembly 302 from the conductive bucket 316 and does not substantially interfere with an electromagnetic window created by the non-conductive antenna cover 318 and communications to and from the antenna assembly 302.

Figure 4:
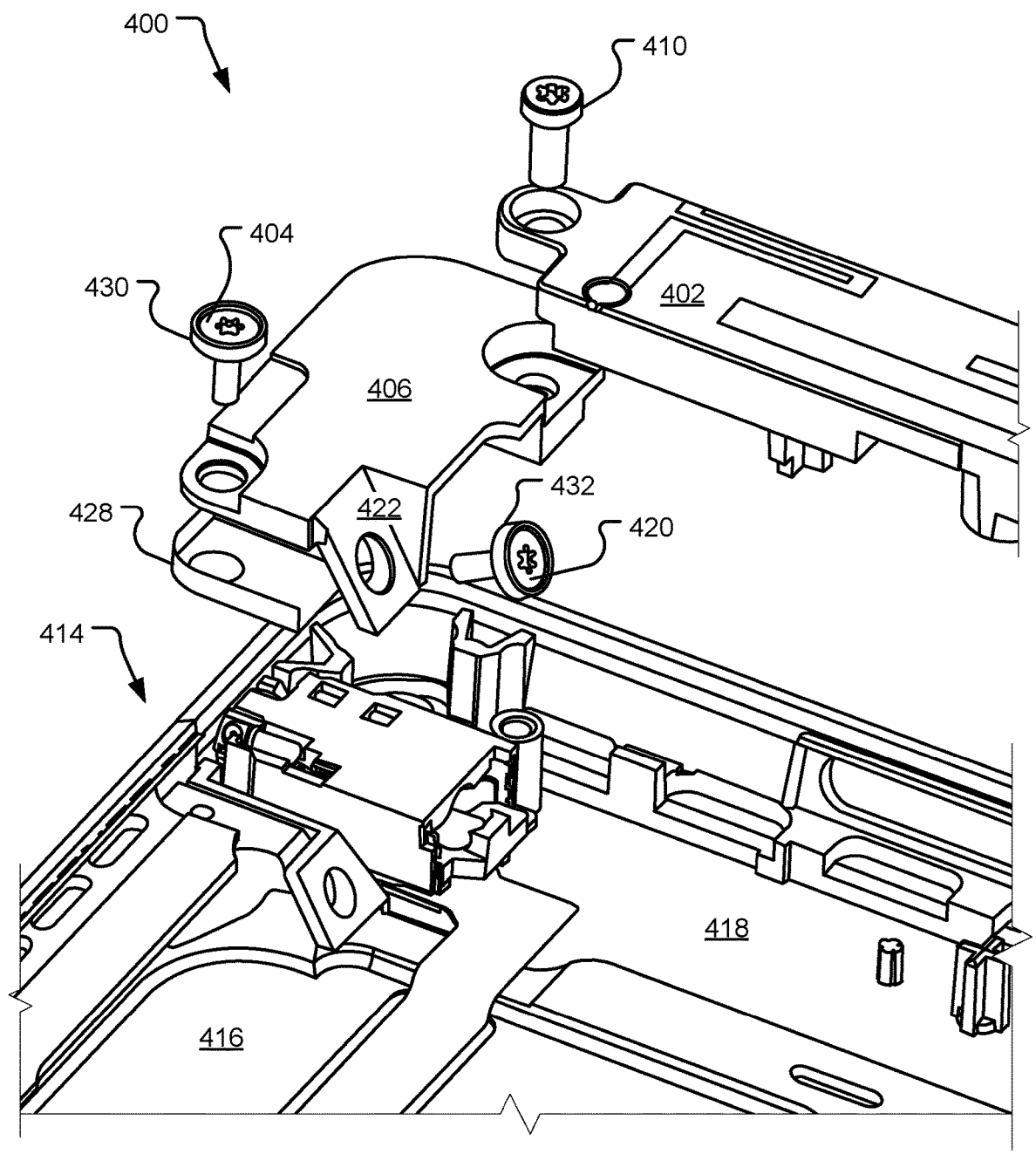
FIG. 4 illustrates a partial exploded perspective view of yet another example electrically isolated corner stiffener assembled within a mobile computing device.

FIG. 4 illustrates a partial exploded perspective view of yet another example electrically isolated corner stiffener 406 assembled within a mobile computing device 400. The mobile computing device 400 includes a touchscreen or other display screen (omitted in FIG. 4 to illustrate internal components of the mobile computing device 400) that spans a front-facing surface and a chassis 414 that spans a rear-facing surface of the mobile computing device 400. The chassis 414 and/or the display screen may also occupy side-facing surfaces of the mobile computing device 400, and in combination encompass internal electronic components of the mobile computing device 400.

The chassis 414 includes both a conductive (or metallic) bucket 416 and a non-conductive (or plastic) antenna cover 418. The conductive bucket 416 is made of a generally stiffer and heavier material than the non-conductive antenna cover 418 and has a greater potential to create electromagnetic interference than the non-conductive antenna cover 418. As a result, the conductive bucket 416 occupies areas of rear-facing and side-facing surfaces of the mobile computing device 400 away from an antenna assembly 402. The non-conductive antenna cover 418 spans rear-facing and side-facing surfaces of the mobile computing device 400 adjacent the antenna assembly 402 and forms a window of wireless connectivity to and from the antenna assembly 402. The non-conductive antenna cover 418 is made of a generally lighter and more flexible material than the conductive bucket 416 and has less potential to create electromagnetic interference.

The antenna assembly 402 includes a substrate or other non-conductive or dielectric material onto which individual metal antennae patterns are printed or individual metal antennae wires are embedded. The substrate or other non-conductive or dielectric material is a supporting structure for the individual metal antennae. The antenna assembly 402 sends outbound wireless signals and/or receives inbound wireless signals using one or more of a variety of communication technologies and protocols. The antenna assembly 402 spans a majority of a side perimeter of the mobile computing device 400 between the corner stiffener 406 and a second corner stiffener oriented at an opposite corner of the mobile computing device 400 (not shown). The second corner stiffener may have the same or similar features as the corner stiffener 406 as described herein.

The corner stiffener 406 is a relatively rigid structure that ties the conductive bucket 416, the non-conductive antenna cover 418, and the antenna assembly 402 together at the depicted corner to enhance structural rigidity of the mobile computing device 400. In some implementations, the corner stiffener 406 is made of an electrically non-conductive material and thus electrically floats with reference to the conductive bucket 416 without additional insulating material. In other implementations, the corner stiffener 406 is made of an electrically conductive material (e.g., a metal alloy). As a result, the corner stiffener 406 is insulated from the conductive bucket 416 using an insulating film 428 and screw insulators (or insulating sleeves) 430, 432.

The insulating film 428 is oriented between the corner stiffener 406 and the conductive bucket 416 during assembly to electrically isolate the corner stiffener 406 from the conductive bucket 416 at all points of contact between the two components. In various implementations, the insulating film 428 may be a solid thin layer, gasket, coating, or a fluid (that later hardens) applied to one or both of the corner stiffener 406 and the conductive bucket 416 during assembly. The insulating film 428 may include plastic, vinyl, polyester, rubber, ceramic, and other non-conductive (or dielectric) materials. To the extent the insulating film 428 is a fluid when applied, insulating material may be combined with a solvent that fluidizes the insulating material, and then evaporates or otherwise dissipates over time, leaving only the insulating material, which yields the insulating film 428.

Each of the conductive bucket 416, the non-conductive antenna cover 418, and the antenna assembly 402 are screwed to the corner stiffener 406. Screw 404 attaches the corner stiffener 406 to the conductive bucket 416. Screw 410 attaches the antenna assembly 402 to both the corner stiffener 406 and the non-conductive antenna cover 418. The screws 404, 410 are oriented in substantially the same direction, which is normal to the display screen of the mobile computing device 400.

The corner stiffener 406 includes an interlocking tab 422, which projects away from the corner stiffener 406 in a plane that substantially differs from the remainder of the corner stiffener 406. Screw 420 attaches the corner stiffener 406 to both the non-conductive antenna cover 418 and the conductive bucket 416 at the interlocking tab 422. The screw 420 is oriented in a different direction than the screws 404, 410, which aids in securing the corner stiffener 406 against movement in all directions within the mobile computing device 400.

As the screws 404, 420 each attach the corner stiffener 406 to the conductive bucket 416, the screws 404, 420 may form an electrically conductive path between the corner stiffener 406 and the conductive bucket 416. As such, the screws 404, 420 include insulators 430, 432, respectively, which electrically isolate the screws 404, 420 from the corner stiffener 406, and thus the conductive bucket 416 from the corner stiffener 406. The screw insulators 430, 432 may be formed similarly, and from similar materials, as that described above with regard to the insulating film 428. In other implementations, the screws 404, 420 themselves are of an electrically insulating material, which may supplement or negate the insulators 430, 432, respectively.

As the screw 410 attaches the antenna assembly 402 to both the corner stiffener 406 and the non-conductive antenna cover 418 (but not the conductive bucket 416), a screw insulator may be omitted from the screw 410. More specifically, as the antenna assembly 402 includes a non-conductive (or dielectric) substrate and the antenna cover 418 is also non-conductive, the corner stiffener 406 need not be separately insulated from the antenna assembly 402 and the non-conductive antenna cover 418 via an insulating film and/or screw insulator(s). As the corner stiffener 406 is electrically floating with reference to the conductive bucket 416, the corner stiffener 406 does not substantially interfere with an electromagnetic window created by the non-conductive antenna cover 418 and communications to and from the antenna assembly 402.

Figure 5:
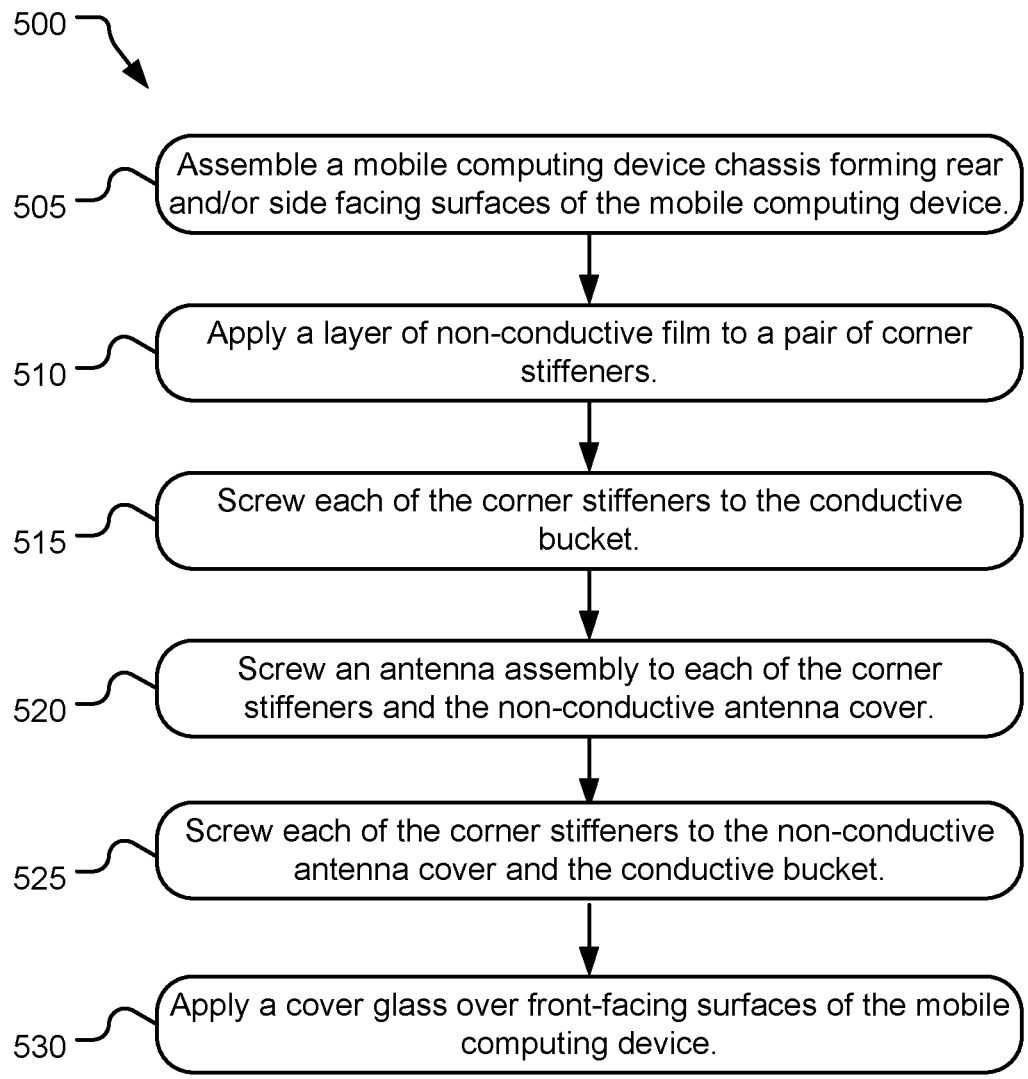
FIG. 5 illustrates example operations for assembling an electrically isolated corner stiffener within a mobile computing device.

FIG. 5 illustrates example operations 500 for assembling an electrically isolated corner stiffener within a mobile computing device. A chassis assembling operation 505 assembles a mobile computing device chassis. In various implementations, the mobile computing device chassis includes a conductive bucket and a non-conductive antenna cover. The conductive bucket occupies areas of rear-facing and/or side-facing surfaces of the mobile computing device away from an antenna assembly. The non-conductive antenna cover spans rear-facing and/or side-facing surfaces of the mobile computing device adjacent the antenna assembly and forms a window of wireless connectivity to and from the antenna assembly.

A film application operation 510 applies a layer of non-conductive film to surfaces of a pair of corner stiffeners intended to directly contact the conductive bucket when assembled. The non-conductive film electrically isolates the corner stiffeners from the conductive bucket and other metallic components of the mobile computing device. In various implementations, including but not limited to those where the corner stiffeners are of a non-conductive material, the film application operation 510 may be omitted. The corner stiffeners may be formed using any available manufacturing technique, including but not limited to, stamping, forging, molding, casting, and extruding.

A first screwing operation 515 screws each of the corner stiffeners to the conductive bucket. A second screwing operation 520 screws the antenna assembly to each of the corner stiffeners and the non-conductive antenna cover. The screwing operations 515, 520 are performed using screws oriented in substantially the same direction, which is normal to a cover glass or display screen (see application operation 530) of the mobile computing device.

The corner stiffener may include an interlocking tab, which projects away from the corner stiffener in a plane that substantially differs from the remainder of the corner stiffener. A third screwing operation 525 further screws each of the corner stiffeners at their respective interlocking tabs to the non-conductive antenna cover and the conductive bucket. The third screwing operation 525 is performed using screws oriented in a different direction than the screws of screwing operations 515, 520, which aids in securing the corner stiffener against movement in all directions within the mobile computing device.

In various implementations, a combination of the first and third screwing operations 515, 525 may also be referred to herein as a first securing operation, which secures each of the pair of corner stiffeners to opposing corners of a device chassis along a side of the mobile computing device using any available fastening mechanism. Further, the second screwing operation 520 may also be referred to herein as a second securing operation, which secures one or more antennae within the mobile computing device spanning an entire distance between the corner stiffeners using any available fastening mechanism.

The screwing operations 515, 520, 525 yield three distinct points at which the corner stiffener is secured to the remainder of the mobile computing device, thereby securing the corner stiffener to the mobile computing device in all degrees of freedom. The result is a stiff attachment that reduces or prevents bending or twisting motion of the computing device at each corner having a corner stiffener under expected loading conditions, including an expected corner impact event. While the securing operations are specifically described in detail above using screwing operations 515, 520, 525, various components of the mobile computing device may be secured together using other mechanisms of fastening and/or assembly (e.g., adhesives, riveting, welding, heat-staking, friction fits, and interference fits).

An application operation 530 applies a cover glass or touchscreen over front-facing surfaces of the mobile computing device. The cover glass or touchscreen may be adhered to or otherwise attached over the antenna assembly, but does not substantially interfere with the window of wireless connectivity to and from the antenna assembly.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

An example mobile computing device according to the presently disclosed technology includes a device chassis, a pair of corner stiffeners, and an antenna assembly. Each of the pair of corner stiffeners are secured to opposing corners of the device chassis along a side of the mobile computing device and the corner stiffeners electrically isolated from the device chassis. The antenna assembly incorporates one or more antennae and spans a distance between the corner stiffeners.

In another example mobile computing device according to the presently disclosed technology, the corner stiffeners are either of an electrically insulating material or of an electrically conductive material coated with an electrically insulating material.

In another example mobile computing device according to the presently disclosed technology, the corner stiffeners are of an electrically conductive material. The example mobile computing device further includes an insulating film oriented between each of the pair of corner stiffeners and the device chassis.

In another example mobile computing device according to the presently disclosed technology, each of the pair of corner stiffeners are secured to the device chassis using one or more screws, and each of the screws are either of an insulating material or including an insulating sleeve that electrically insulates the corner stiffeners from the device chassis.

In another example mobile computing device according to the presently disclosed technology, the antenna assembly is secured to each of the pair of corner stiffeners.

In another example mobile computing device according to the presently disclosed technology, the device chassis includes a non-conductive antenna cover spanning a rear-facing area of the mobile computing device adjacent the antenna assembly and a conductive bucket. The conductive bucket and the non-conductive antenna cover in combination span a majority of the rear-facing area of the mobile computing device and the corner stiffeners are electrically isolated from the conductive bucket.

In another example mobile computing device according to the presently disclosed technology, each of the pair of corner stiffeners are screwed to both the non-conductive antenna cover and the conductive bucket.

In another example mobile computing device according to the presently disclosed technology, each of the pair of corner stiffeners includes one or more interlocking tabs projecting away from a remaining portion of the corner stiffeners.

In another example mobile computing device according to the presently disclosed technology, at least one of the interlocking tabs is screwed to the device chassis.

In another example mobile computing device according to the presently disclosed technology, at least one of the interlocking tabs interfaces with a matching receptacle in the device chassis.

In another example mobile computing device according to the presently disclosed technology, each of the pair of corner stiffeners are screwed to the device chassis at two or more points with screws oriented in different directions.

In another example mobile computing device according to the presently disclosed technology, the antenna assembly spans an entire distance between the corner stiffeners.

An example method of assembling a mobile computing device according to the presently disclosed technology includes securing each of a pair of electrically isolated corner stiffeners to opposing corners of a device chassis along a side of the mobile computing device and securing an antenna assembly within the mobile computing device spanning a distance between the corner stiffeners.

Another example method of assembling a mobile computing device according to the presently disclosed technology further includes assembling the device chassis prior to securing the corner stiffeners and the antenna assembly within the mobile computing device. The device chassis including a non-conductive antenna cover to span a rear-facing area of the mobile computing device adjacent the antenna assembly and a conductive bucket. The conductive bucket and the non-conductive antennae cover to span in combination a majority of the rear-facing area of the mobile computing device, wherein the corner stiffeners are electrically isolated from the conductive bucket.

Another example method of assembling a mobile computing device according to the presently disclosed technology further includes applying an insulating film oriented between each of the pair of corner stiffeners and the device chassis prior to securing the corner stiffeners to the device chassis.

In another example method of assembling a mobile computing device according to the presently disclosed technology, securing the corner stiffeners to the device chassis includes first screwing the corner stiffeners to the conductive bucket and second screwing the corner stiffeners to the non-conductive antenna cover and the conductive bucket. The second screwing operation utilizes a screw oriented in a different direction than a first screw utilized in the first screwing operation.

In another example method of assembling a mobile computing device according to the presently disclosed technology, each of the screws used in the first screwing operation and the second screwing operation are either of an insulating material or including an insulating sleeve that electrically insulates the corner stiffeners from the device chassis.

In another example method of assembling a mobile computing device according to the presently disclosed technology, securing the antenna assembly within the mobile computing device includes screwing the antenna assembly to each of the corner stiffeners and the non-conductive antenna cover, wherein the antenna assembly spans an entire distance between the corner stiffeners.

In another example method of assembling a mobile computing device according to the presently disclosed technology, the corner stiffeners are either of an electrically insulating material or of an electrically conductive material coated with an electrically insulating material.

An example mobile computing device according to the presently disclosed technology includes a conductive bucket, a non-conductive antenna cover, a pair of corner stiffeners, and an antenna assembly. The conductive bucket and the non-conductive antenna cover in combination span a majority of the rear-facing area of the mobile computing device. Each of the pair of corner stiffeners are secured to opposing corners of the conductive bucket and the non-conductive antenna cover along a side of the mobile computing device and are electrically isolated from the conductive bucket. The antenna assembly incorporates one or more antennae oriented adjacent the non-conductive antenna cover and the antenna assembly is secured to the corner stiffeners and spans an entire distance between the corner stiffeners.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A mobile computing device comprising:
a device chassis;
a pair of corner stiffeners, each of the corner stiffeners are of an electrically insulating material or of an electrically conductive material coated with an electrically insulating material, each of the corner stiffeners are secured to opposing corners of the device chassis along a side of the mobile computing device, and each of the corner stiffeners are electrically isolated from the device chassis; and
an antenna assembly incorporating one or more antennae, the antenna assembly directly secured to and spanning a distance between the corner stiffeners.

2. The mobile computing device of claim 1, further comprising:
an insulating film oriented between each of the pair of corner stiffeners and the device chassis.

3. The mobile computing device of claim 1, wherein each of the pair of corner stiffeners are secured to the device chassis using one or more screws, and wherein each of the screws are either of an insulating material or including an insulating sleeve that electrically insulates the corner stiffeners from the device chassis.

4. The mobile computing device of claim 1, wherein the device chassis includes:
a non-conductive antenna cover spanning a rear-facing area of the mobile computing device adjacent the antenna assembly; and
a conductive bucket, wherein the conductive bucket and the non-conductive antenna cover in combination span a majority of the rear-facing area of the mobile computing device, and wherein the corner stiffeners are electrically isolated from the conductive bucket.

5. The mobile computing device of claim 4, wherein each of the pair of corner stiffeners are screwed to both the non-conductive antenna cover and the conductive bucket.

6. The mobile computing device of claim 1, wherein the each of the pair of corner stiffeners includes one or more interlocking tabs projecting away from a remaining portion of the corner stiffeners.

7. The mobile computing device of claim 6, wherein at least one of the interlocking tabs is screwed to the device chassis.

8. The mobile computing device of claim 6, wherein at least one of the interlocking tabs interfaces with a matching receptacle in the device chassis.

9. The mobile computing device of claim 1, wherein each of the pair of corner stiffeners are screwed to the device chassis at two or more points with screws oriented in different directions.

10. The mobile computing device of claim 1, wherein the antenna assembly spans an entire distance between the corner stiffeners.

11. A method of assembling a mobile computing device, the method comprising:
securing each of a pair of electrically isolated corner stiffeners to opposing corners of a device chassis along a side of the mobile computing device, wherein each of the corner stiffeners are of an electrically insulating material or of an electrically conductive material coated with an electrically insulating material; and
securing an antenna assembly within the mobile computing device directly to and spanning a distance between the corner stiffeners.

12. The method of claim 11, further comprising:
assembling the device chassis prior to securing the corner stiffeners and the antenna assembly within the mobile computing device, the device chassis including:
- a non-conductive antenna cover to span a rear-facing area of the mobile computing device adjacent the antenna assembly; and
- a conductive bucket, the conductive bucket and the non-conductive antenna cover to span in combination a majority of the rear-facing area of the mobile computing device, and wherein the corner stiffeners are electrically isolated from the conductive bucket.

13. The method of claim 11, further comprising:
applying an insulating film oriented between each of the pair of corner stiffeners and the device chassis prior to securing the corner stiffeners to the device chassis.

14. The method of claim 12, wherein securing the corner stiffeners to the device chassis includes:
- first screwing the corner stiffeners to the conductive bucket; and
- second screwing the corner stiffeners to the non-conductive antenna cover and the conductive bucket, wherein the second screwing operation utilizes a screw oriented in a different direction than a first screw utilized in the first screwing operation.

15. The method of claim 14, wherein each of the screws used in the first screwing operation and the second screwing operation are either of an insulating material or including an insulating sleeve that electrically insulates the corner stiffeners from the device chassis.

16. The method of claim 12, wherein securing the antenna assembly within the mobile computing device includes:
screwing the antenna assembly to each of the corner stiffeners and the non-conductive antenna cover, wherein the antenna assembly spans an entire distance between the corner stiffeners.

17. A mobile computing device comprising:
a conductive bucket;
a non-conductive antenna cover, wherein the conductive bucket and the non-conductive antenna cover in combination span a majority of the rear-facing area of the mobile computing device;
a pair of corner stiffeners, each of the corner stiffeners are of an electrically insulating material or of an electrically conductive material coated with an electrically insulating material, each of the corner stiffeners are secured to opposing corners of the conductive bucket and the non-conductive antenna cover along a side of the mobile computing device, and each of the corner stiffeners are electrically isolated from the conductive bucket; and
an antenna assembly incorporating one or more antennae oriented adjacent the non-conductive antenna cover, the antenna assembly directly secured to the corner stiffeners and spanning an entire distance between the corner stiffeners.

18. The mobile computing device of claim 1, wherein the antenna assembly is electrically isolated from the device chassis.

19. The mobile computing device of claim 1, wherein the antenna assembly is an electronic component internal to the mobile computing device.

* * * * *